Sept. 22, 1970   G. LAUKIEN   3,530,372
METHOD AND APPARATUS FOR SELECTING PLANT SEEDS FOR SOWING
Filed March 1, 1968   3 Sheets-Sheet 2
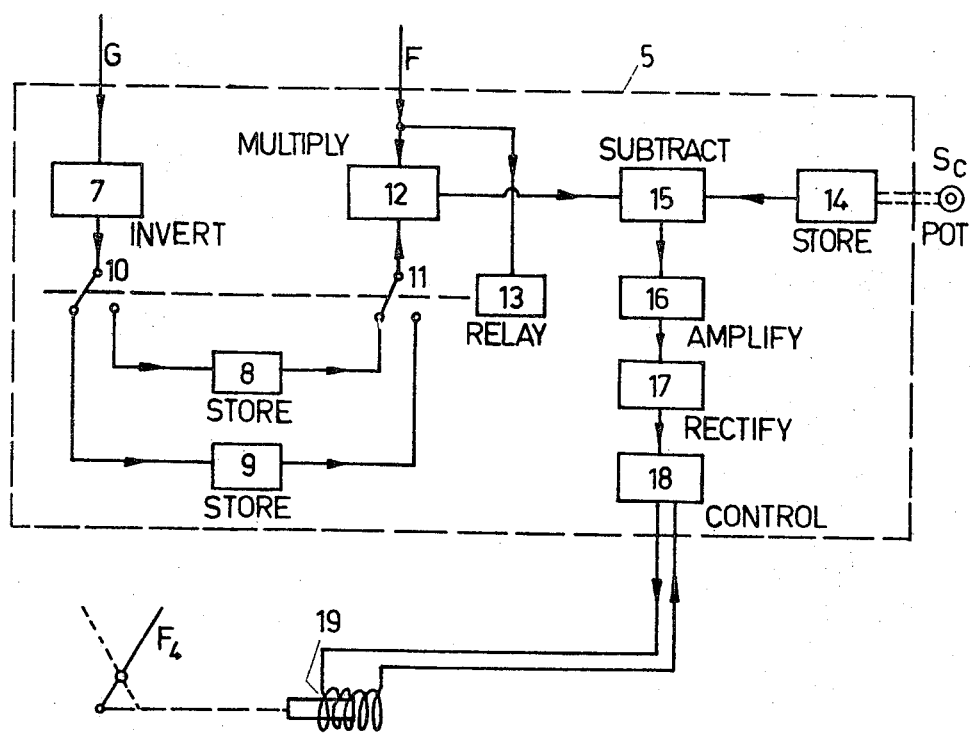
Fig. 2
Fig. 3
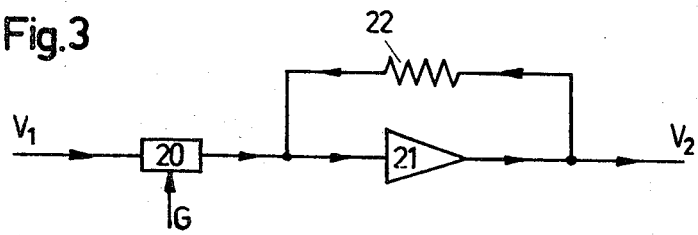
INVENTOR:
Günther Laukien
BY Spencer & Kaye
Attorneys

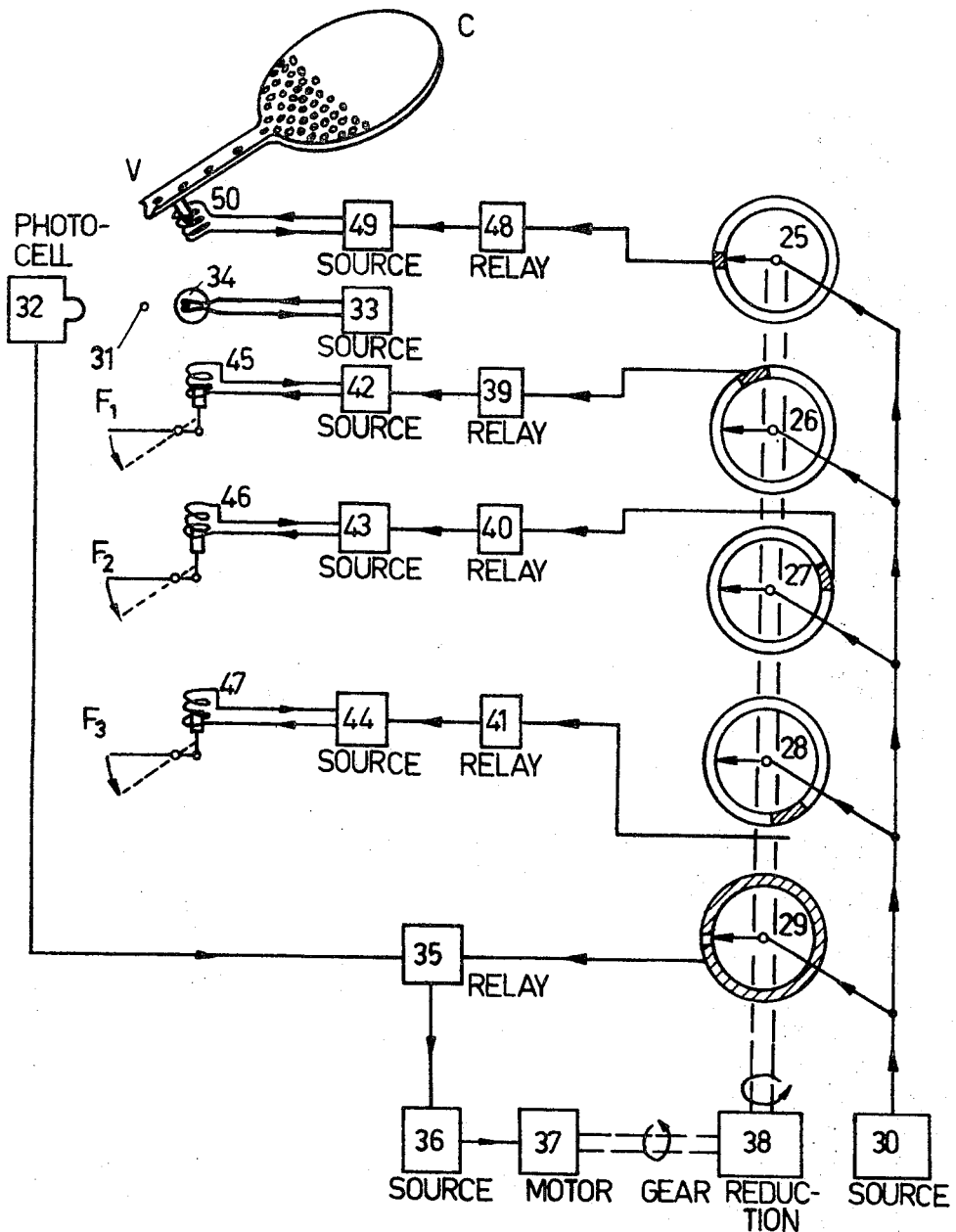

United States Patent Office 3,530,372
Patented Sept. 22, 1970

3,530,372
METHOD AND APPARATUS FOR SELECTING PLANT SEEDS FOR SOWING
Günther Laukien, Silberstreifen, 7501 Forchheim, near Karlsruhe, Germany
Filed Mar. 1, 1968, Ser. No. 709,771
Claims priority, application Switzerland, Mar. 3, 1967, 3,183/67
Int. Cl. G01n 27/78
U.S. Cl. 324—.5          5 Claims

ABSTRACT OF THE DISCLOSURE

A method and apparatus for automatically non-destructively testing plant seeds and sorting the seeds on the basis of their content of a specific substance. The weight of a particular seed and the amount of the given substance contained in it are determined automatically, from which the specific content of this substance of the seed is calculated automatically, whereupon suitable seeds are selected using as the criterion whether the specific content is greater than a prescribed desired value.

BACKGROUND OF THE INVENTION

The present invention relates to a method and apparatus for non-destructively measuring the content of a specific substance, such as e.g. water, oil, etc., in plant seeds and for sorting the seeds according to the results of the measurement.

An effective method for raising varieties of plants, so that their seeds will have a high specific content of some desired substance, is to select those seeds produced in one harvest which have their specific substance content above a prescribed level and to use only those seeds for further cultivation. It is possible, in this way, for example to increase the specific oil content of rapeseeds, poppy, soybeans, peanuts, sunflowers, walnuts, hazelnuts, hemp, ricinus, etc., or to increase the hydrocarbon content of beans, peas, peanuts, etc., or the content of an aromatic component of spice-seeds. To increase, for instance, the oil content of peanuts, one measures the hydrocarbon groups of the liquid part; to increase the nutritive value of the same fruit one measures the proton content of the solid part. The possibility to measure other nuclei such as fluorine, phosphorus, nitrogen, etc. allows to increase the content of compounds of these elements in a seed and opens new possibilities not known up to this date.

The specific content S of a substance in a seed is given by the ratio of the total content F of the selected substance to the total weight G of the seed. That is, $$S = F/G$$

If the specific content S of a seed is found to be greater than a desired critical value $S_c$, then the seed is a suitable one for planting.

Although this method for improving certain types of plants has been known in the art, practical difficulties have prevented the use of the method on anything but a very small scale. Since the determination of the oil content of a seed, for example, has required that the seed be crushed, i.e. destroyed, it has in the past been necessary to carry out the method by separately harvesting the seeds of each individual plant, subjecting a portion of each harvest to the destructive measurement and, if the oil content of the portion of the seeds happens to lie above the critical value, utilizing the remaining seeds of the particular plant for growing further plants.

A method for non-destructively measuring the total content F of a particular substance in a single seed has recently become known, however. This method employs the nuclear magnetic reasonance phenomenon and, in the simplest cases, involves the measurement of the total quantity of protons contained in the seed. A characteristic of this method is that the measurement may easily be controlled in such a way that only those protons which are contained in molecules that are in the liquid state inside the seed contribute to the result. The protons forming the molecules of the solid portions of the seed can be excluded from the count.

Instead of counting protons, the nuclear magnetic resonance methods of measuring can also be adapted to count the quantity of other atomic nuclei, e.g. $C^{13}$, $F^{19}$, $P^{31}$ or the quantity of one or more atomic groups of a molecule such as methyl or ethyl groups which are typical of the seed fluid. It is even possible in this way to determine the content of one particular fluid out of a fluid mixture contained in a seed, or to determine the amount of a solid substance or substances in the solid matter or solid-fluid mixture contained in the seed which is or are important in determining the value of the seed.

SUMMARY OF THE INVENTION

An object of the present invention, therefore, is to develop a method as well as apparatus for carrying out the method for efficiently and rapidly testing plant seeds, without destroying them, for a specific content of a certain substance and for selecting those seeds, on the basis of the test, which may be useful for further cultivation.

This as well as other objects which will become apparent in the discussion that follows is achieved, according to the present invention, by the method of automatically measuring the weight of an individual seed and the amount of the particular substance contained in the seed, automatically calculating the specific content of the substance in the seed and automatically selecting the seed if the specific content is greater than a prescribed critical value.

This method, according to the present invention, may be carried out by apparatus which includes a microbalance for weighing one seed at a time and nuclear magnetic resonance measuring means for determining the amount of the given substance which contributes to the seed weight. The outputs of the microbalance and the measuring means are connected to a calculation device which determines the ratio of the amount of the substance to the weight of the seed and compares this ratio with a prescribed reference value. A sorter connected to the calculating device is provided to group the seed into one group if the ratio is greater or equal to the reference value and into another if the ratio is less than the reference value.

The method and apparatus according to the present invention make it possible to non-destructively test and sort large quantities of seeds at a rapid rate without regard to the plants from which they are harvested. Not only can the seeds be sorted so that *all* the seeds of a given harvest which have a specific substance content S above a critical value $S_c$ may be selected for further planting, but the sorting can now be carried out on a large scale so that the evolution of superior varieties of plants can be accelerated.

As an example, if the method and apparatus according to the present invention is applied to the testing and sorting of a hypothetic seed with a view to increasing the yield of the substance X in future seeds, the following range of measurements might be obtained:

TABLE I

Seed weight (G): 300 to 550 mg.
Substance X content (F): 110 to 210 mg.
Specific content (S): 0.35 to 0.4.

If now the critical specific content ($S_c$) is chosen to be 0.38 about 30% of the controlled seeds which contain the highest specific yield in the substance X may be selected for further cultivation.

BRIEF DESCRIPTION OF THE DRAWING

FIG. 2 is a schematic diagram showing a portion of the calculation and control device of FIG. 1.

FIG. 3 is a schematic diagram showing the inversion device of FIG. 2.

FIG. 4 is a schematic diagram of an embodiment of the time control mechanism employed in the calculation and control device of FIG. 1.

DESCRIPTION OF THE PREFERRED EMBODIMENT

Figure 1:
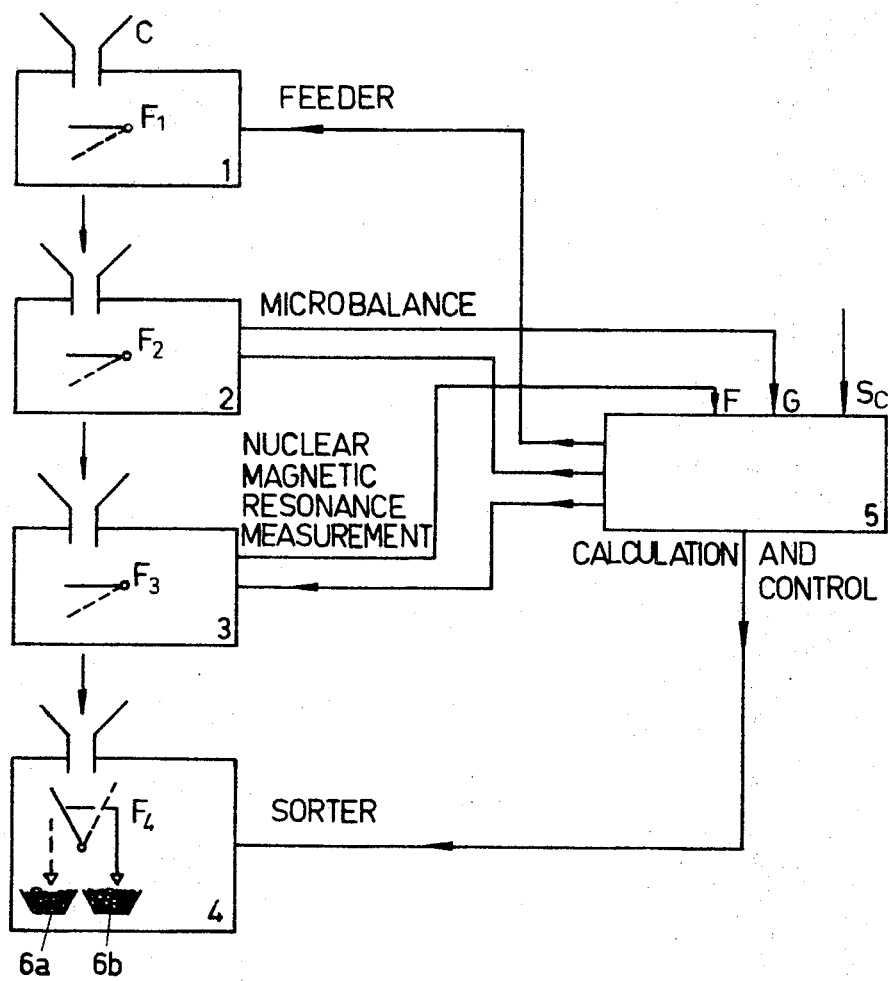
FIG. 1 is a schematic diagram showing a preferred embodiment of the apparatus according to the present invention.

Referring now to the drawings, FIG. 1 schematically shows a preferred embodiment of particular apparatus which can carry out the method of the present invention; that is, non-destructively measure the specific content S of a certain substance of plant seeds and sort the seeds according to the result of the measurement. The apparatus includes a seed feeding device 1 which supplies individual seeds from a container C to a micro-balance 2. This micro-balance weighs the seeds and sends the weight G, for example in electric analog or digital form, to the calculation and control device 5 which stores the information for further use. After the seed is weighed it is fed to the nuclear magnetic resonance measuring device 3 which measures the content in the seed of a particular substance. The substance itself may be selected at the device. The integrated nuclear resonance signal, which is proportional to the content F of the substance, then also is sent, likewise as an analog or digital signal, to the calculation and control device 5.

The calculation and control device 5 now forms the quotient $S=F/G$ and compares the quotient with a critical value $S_c$ which has been set into the calculation and control device by hand. This comparison may be accomplished in any manner known in the art; common analog or digital circuits are available, for example, for this purpose. The result of this comparison is sent from the calculation and control device 5 to the sorting mechanism 4, which is preferably electrically controlled. The sorting mechanism may, for example, be provided with a sorting flap $F_4$, as shown, which is set toward the left whenever the sorting mechanism receives a signal corresponding to the condition $S \geq S_c$ and set toward the right when it receives a signal corresponding to $S < S_c$. This causes the good seeds ($S \geq S_c$) to fall into the right container $6_b$ and the rejected seeds to the left container $6_a$.

The seed feeding mechanism which is schematically illustrated by flaps $F_1$, $F_2$ and $F_3$ in each of the feeding stages of the apparatus is so controlled by the calculation and control device 5 that sufficient time is provided for each measurement. In the simplest case a new seed is allowed to drop from the supply continer C only when the previous seed has traversed the entire mechanism. If the calculation and control device is provided with the necessary storage elements, a number of seeds can be allowed to move through the apparatus simultaneously, so that three consecutive seeds can be weighed, measured for substance content and sorted, respectively, all at the same time while the respective results are stored in the device 5.

An exemplary embodiment of the calculating portion of the calculation and control device 5 is illustrated in FIG. 2. The measured value G initially passes through a stage which forms the reciprocal of the value G. This stage 7, which may be called an inversion device, will be described in detail below in connection with FIG. 3. The value $1/G$ so formed passes through a selector switch 10 to one of two storage elements 8 and 9. The result F of the nuclear magnetic resonance measurement provides an input for a multiplication stage 12 as well as a relay stage 13 which actuates the coupled switches 10 and 11. Entry of a value F into the calculation and control device thus causes the previously stored value $1/G$ to be introduced into the multiplication stage, the storage element from whence it came to be cleared and the other storage element to be connected to receive the next value of $1/G$.

The multiplication stage 12 forms the product F times $1/G$. The desired critical or minimum value of $F/G$, that is $S_c$, which has been set into a storage element 14 by hand by a potentiometer or like device and remains constant for a given series of tests, is then compared with the output of the multiplication stage in a subtraction stage 15. The difference, $S-S_c$, is then sent through an amplifier 16 and a rectifier 17 which measures the sign of the difference. So long as $S-S_c$ is less than or equal to zero no current will pass through the rectifier 17 to the magnet current control device 18, and the solenoid 19 will receive no current. If the difference $S-S_c$ becomes positive, however, the rectifier 17 will conduct current to the input of the magnet current control device 18 which, in turn, will supply current to the solenoid 19. If, for example, the flap $F_4$ is mechanically biassed by means of a spring so that it normally lies in the righthand position, as shown, the excited solenoid will switch it into the left-hand position. When the difference $S-S_c$ becomes negative again the solenoid 19 will be de-excited and the flap allowed to move back again toward the right.

All the individual stages employed in the portion of the calculation and control device illustrated in FIG. 2 may be realised by analog stages which are common and well known to those skilled in the art. An analog embodiment of the inversion device 7 is e.g. shown in FIG. 3, however, since this stage may be less commonly employed than the others. As is seen in FIG. 3 a voltage $V_1$ is applied to a resistance circuit 20, the resistance of which is made proportional to the measured value G. The instantaneous resistance of this circuit is thus G times $r$; where $r$ is a selected constant. The resistance circuit 20 is connected to an operational amplifier 21 having a feedback resistance 22 of value R. The output of the amplifier $V_2$ is therefore given $$V_2 = V_1 \frac{R}{G.r}$$

which, after suitable normalization, represents the value $1/G$.

It will be appreciated that the circuit shown in FIG. 2 may also be realized using suitable digital stages having the same functions as the stages described in connection with FIG. 2. It is only necessary to substitute a suitable gate, for example, for the rectifier 17.

An exemplary embodiment of the time control mechanism of the calculation and control device 5 is illustrated in FIG. 4. The time control is assumed by a rotating multiple pole time switch that has a number of switch units 25 to 29 with movable contacts arranged mechanically to rotate about a common shaft and connected electrically to a common voltage source 30.

The time control mechanism is shown in operation at the precise moment when a seed 31 falls from a container C onto the flap $F_1$. A photocell having an amplifier 32 which intercepts a light beam produced by a source 33 of electrical power connected to a light source 34 sends an amplified pulse to the relay 35 when the seed drops across the light beam. The relay 35 turns on the power source 36 which feeds power to an electric motor 37. The rotational motion of the electric motor is transmitted to the rotating time switch through a reduction gear unit 38.

As the time switch begins to rotate the switch unit 29 immediately closes the circuit between the voltage source 30 and the relay 35 so that the time switch will continue to rotate until it makes almost one complete revolution.

Only then will the switch unit 29 open the circuit and turn off the motor 37. During this rotation successive ones of the switch units 26, 27 and 28 will connect the voltage source 30 to the relays 39, 40 and 41, respectively, at suitable successive intervals. As a result, the seed feeding power sources 42, 43 and 44 will be successively switched on causing the solenoids 45, 46 and 47 to operate the flaps $F_1$, $F_2$ and $F_3$, respectively.

Shortly before the switch unit 29 turns off the motor 37, the switch unit 25 will activate the relay 48. This relay 48 is operative to connect a source 49 of alternating current to the magnets 50 of a vibrating feed mechanism V at the exit of the container C. A new seed will drop down, as a result, setting the motor 37 in operation again, thus instituting a new measuring cycle. Immediately after the time switch has again been started the switch unit 25 breaks contact and switches off the vibrator V.

The circuits shown in FIG. 2 and FIG. 4, when combined, provide the calculation and control functions of the calculation and control device 5 of FIG. 1. The circuits shown in FIGS. 2 and 4 actually operate independently of each other. Whereas the circuit of FIG. 2 calculates and provides control for the last flap $F_4$, the circuit of FIG. 4 controls the flaps $F_1$, $F_2$ and $F_3$ as well as a vibrating mechanism connected to the container C. For each complete revolution of the time control circuit of FIG. 4 one seed is allowed to pass entirely through the measuring and sorting apparatus and a new seed is started on its way.

It may be seen that the relay 13 of FIG. 2 may also be employed to actuate the flap $F_1$. An additional storage element can be provided as well to store the value F and additional relays can be used to actuate the flaps $F_2$ and $F_3$. It is possible in this way to eliminate the time switch of FIG. 4 entirely by modifying the circuit of FIG. 2 with the necessary control storage elements, control relays and control switches, so that it assumes the entire control function. If the flaps $F_1$, $F_2$ and $F_3$ are thus directly controlled in response to the receipt of the measurement values F and G, the seeds will remain in each measuring stage for a shorter length of time and the speed of the entire measuring process will be increased.

The great advantage of the apparatus according to the present invention is that the seeds of any number of plants can be placed together in a single bin or container C for non-destructive testing and automatic sorting into seeds which are useful for further cultivation and seeds which are not. The apparatus is thus operative to efficiently and rapidly sort large quantities of seeds without the expenditure of manual labor.

It will be understood, however, that both the method and apparatus are susceptible to various modifications, changes and adaptations and that the same are intended to be comprehended within the meaning and range of equivalents of the appended claims.

I claim:
1. A method for selecting plant seeds for sowing from a plurality of seeds while retaining their germinating property, comprising the steps of:
   (a) automatically separating an individual one of the seeds from the plurality of seeds;
   (b) automatically measuring the weight of said one seed;
   (c) automatically measuring the amount of a given substance contained in said one seed while retaining the germinating property of the seed;
   (d) automatically calculating the specific content of said substance in said one seed; and
   (e) automatically selecting said one seed if said specific content is greater than a prescribed critical value.
2. The method as claimed in claim 1, wherein the amount of a given substance, contained in one of said seed, is measured by nuclear magnetic resonance methods.
3. An apparatus for selecting plant seeds for sowing while retaining their germinating property comprising, in combination:
   (a) means for weighing one of said seeds;
   (b) means for determining the amount of a given substance in said one seed while retaining the germinating property of the seed;
   (c) calculating means, connected to means (a) and means (b), for determining the ratio of the amount of said substance to the weight of said one seed and for comparing said ratio with a prescribed reference value;
   (d) sorting means, connected to said calculating means, for grouping said one seed in one group if said ratio is greater or equal to said reference value and grouping said one seed in another group if said ratio is less than said reference value; and
   (e) control means for the automatic transport of the individual seeds successively from a container to means (a), means (b) and means (d).
4. The apparatus defined in claim 3, wherein said weighing means includes a microbalance.
5. The apparatus defined in claim 4, wherein said means for determining the amount of a given substance includes nuclear magnetic resonance measuring means.

References Cited

UNITED STATES PATENTS 3,068,398   12/1962   Shoolery _____ 324—.5

RUDOLPH V. ROLINEC, Primary Examiner

M. J. LYNCH, Assistant Examiner

U.S. Cl. X.R.

47—14; 209—111.5